United States Patent
Lampkins et al.

(10) Patent No.: US 10,721,073 B2
(45) Date of Patent: Jul. 21, 2020

(54) BIDIRECTIONAL BLOCKCHAIN

(71) Applicant: HRL Laboratories, LLC, Malibu, CA (US)

(72) Inventors: Joshua D. Lampkins, Gardena, CA (US); Hyun (Tiffany) J. Kim, Irvine, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 16/444,903

(22) Filed: Jun. 18, 2019

(65) Prior Publication Data
US 2020/0036530 A1  Jan. 30, 2020

Related U.S. Application Data

(60) Provisional application No. 62/711,355, filed on Jul. 27, 2018.

(51) Int. Cl.
*H04L 9/32* (2006.01)
*H04L 9/30* (2006.01)
*G06F 21/64* (2013.01)

(52) U.S. Cl.
CPC ............ *H04L 9/3236* (2013.01); *G06F 21/64* (2013.01); *H04L 9/30* (2013.01); *H04L 2209/38* (2013.01); *H04L 2209/46* (2013.01)

(58) Field of Classification Search
CPC . G06F 21/64; H04L 2209/38; H04L 2209/46; H04L 9/085; H04L 9/30; H04L 9/3236; H04L 9/3239; H04L 9/3247
See application file for complete search history.

(56) References Cited

U.S. PATENT DOCUMENTS

| | | | |
|---|---|---|---|
| 9,635,000 B1 | 4/2017 | Muftic | |
| 2016/0261409 A1* | 9/2016 | French | H04L 9/3066 |
| 2016/0330034 A1* | 11/2016 | Back | G06Q 20/06 |
| 2017/0338947 A1* | 11/2017 | Ateniese | G06F 3/0659 |
| 2017/0344983 A1 | 11/2017 | Muftic | |
| 2018/0034810 A1 | 2/2018 | Pe'er et al. | |
| 2018/0130130 A1* | 5/2018 | Dechu | G06Q 40/04 |

(Continued)

OTHER PUBLICATIONS

Search Query Report from IP.com (performed Mar. 19, 2020).*
Damgård I., Nielsen J.B. (2007) Scalable and Unconditionally Secure Multiparty Computation. In: Menezes A. (eds) Advances in Cryptology—CRYPTO 2007. Lecture Notes in Computer Science, vol. 4622. Springer, Berlin, Heidelberg, pp. 572-590.

(Continued)

*Primary Examiner* — Sharon S Lynch
(74) *Attorney, Agent, or Firm* — Tope-McKay & Associates

(57) ABSTRACT

Described is a system for improving data authentication using blockchain technology and multi-party computation (MPC). The system ensures authenticity of distributed data sent from one or more servers to the distributed clients. The system initializes MPC protocols to ensure secrecy of keys used to sign a new data element. Blockchain technology is utilized to ensure correctness and integrity of the new data element. A bidirectional blockchain is used such that a forward blockchain stores the new data element to be received by the distributed clients, and a reverse blockchain stores a public key used by the distributed clients to verify authenticity of the new data element stored in the forward blockchain. Signing of the new data element with the public key causes a previous public key to expire.

15 Claims, 8 Drawing Sheets

(56) References Cited

U.S. PATENT DOCUMENTS

| | | | | |
|---|---|---|---|---|
| 2018/0329964 A1* | 11/2018 | Tolani | | G06F 9/54 |
| 2018/0330077 A1* | 11/2018 | Gray | | G06F 21/53 |
| 2018/0330078 A1* | 11/2018 | Gray | | G06F 21/71 |
| 2018/0330079 A1* | 11/2018 | Gray | | G06F 21/53 |
| 2018/0330125 A1* | 11/2018 | Gray | | H04L 9/14 |
| 2018/0330343 A1* | 11/2018 | Gray | | G06Q 20/3829 |
| 2018/0331821 A1* | 11/2018 | Gray | | G06F 21/51 |
| 2018/0332011 A1* | 11/2018 | Gray | | H04L 9/3234 |
| 2018/0359096 A1* | 12/2018 | Ford | | H04L 9/3236 |
| 2018/0373776 A1* | 12/2018 | Madisetti | | H04L 9/3234 |
| 2019/0034459 A1* | 1/2019 | Qiu | | H04L 41/12 |
| 2019/0036711 A1* | 1/2019 | Qiu | | H04L 9/0637 |
| 2019/0102758 A1* | 4/2019 | Wright | | G06Q 20/382 |
| 2019/0146979 A1* | 5/2019 | Madisetti | | H04L 9/0637 707/634 |
| 2019/0349426 A1* | 11/2019 | Smith | | H04L 69/22 |
| 2020/0057869 A1* | 2/2020 | Wilke | | H04L 9/3247 |

OTHER PUBLICATIONS

FIPS PUB 180-4, Federal Information Processing Standards Publication, Secure Hash Standard (SHS), Aug. 2015, pp. 1-31.

Internet Engineering Task Force, PKCS #1: RSA Cryptography Specifications Version 2.2, Oct. 2012, Sections 7 and 8.

Guy Zyskind, Oz Nathan, and Alex Pentland, "Enigma: Decentralized Computation Platform with Guaranteed Privacy," Cryptography and Security (cs.CR); Distributed, Parallel, and Cluster Computing (cs.DC), arXiv:1506.0347, 2015, pp. 1-14.

Notification of Transmittal of International Search Report and the Written Opinion of the International Searching Authority for PCT/US2019/037790; dated Oct. 4, 2019.

International Search Report of the International Searching Authority for PCT/US2019/037790; dated Oct. 4, 2019.

Written Opinion of the International Searching Authority for PCT/US2019/037790; dated Oct. 4, 2019.

\* cited by examiner

US 10,721,073 B2

BIDIRECTIONAL BLOCKCHAIN

CROSS-REFERENCE TO RELATED APPLICATIONS

This is a Non-Provisional application of U.S. Provisional Application No. 62/711,355, filed in the United States on Jul. 27, 2018, entitled, "Bidirectional Blockchain," the entirety of which is incorporated herein by reference.

BACKGROUND OF INVENTION

(1) Field of Invention

The present invention relates to a system for improving data authentication and, more particularly, to a system for improving data authentication using blockchain technology and multi-party computation.

(2) Description of Related Art

Secure multi-party computation (MPC) is a subfield of cryptography with the goal of creating methods for parties to jointly compute a function over their inputs while keeping those inputs private. Unlike traditional cryptographic tasks, the adversary in this model controls actual participants. A blockchain is a collection of data that is segregated into a list of blocks. Each block is cryptographically linked to the previous block in such a way that one cannot edit a block without editing all subsequent blocks.

Checking data integrity involves computing a cryptographic checksum on the data, and the popular approach applies a cryptographic hash function on the data, such as the functions SHA128, SHA256, or SHA512. In addition to data integrity, checking data authenticity involves verifying a signature on the data using a public key signature scheme such as RSA (Rivest-Shamir-Adleman). To generate a signature, the data generator uses his/her private key to sign the data, and the recipient uses the data generator's known public key to verify the signature. One main drawback of signature-based authentication is that if an adversary steals or compromises the private key, then the adversary can falsify data until such time as the key is revoked or expires.

Thus, a continuing need exists for a system that requires a new public/private key pair be used each time a new piece of software is signed such that the window of time in which a key is valid and an adversary can compromise a key in order to falsify data is small.

SUMMARY OF INVENTION

The present invention relates to a system for improving data authentication and, more particularly, to a system for improving data authentication using blockchain technology and multi-party computation. The system comprises one or more processors and a non-transitory computer-readable medium having executable instructions encoded thereon such that when executed, the one or more processors perform multiple operations. The system ensures authenticity of a set of distributed data sent from one or more servers to the distributed clients, where in ensuring authenticity of the set of distributed data, the system initializes a plurality of multiparty (MPC) protocols to ensure secrecy of keys used to sign a new data element. Blockchain technology is utilized to ensure correctness and integrity of the new data element, wherein a bidirectional blockchain, comprising a forward blockchain and a reverse blockchain, is used such that the forward blockchain stores the new data element to be received by the distributed clients, and the reverse blockchain stores a public key used by the distributed clients to verify authenticity of the new data element stored in the forward blockchain, wherein signing of the new data element with the public key causes a previous public key to expire.

In another aspect, the plurality of MPC protocols comprises an Initialize protocol, wherein a list of public/private key pairs is generated, the reverse blockchain, comprising reverse blocks of data, is constructed, and the list of public/private key pairs, comprising public keys and private keys, and the reverse blocks of data are stored in a distributed manner among a set of MPC servers; a GenerateBlock protocol that allows a signing server to generate a new forward block of data and distribute the new forward block of data to a set of blockchain nodes, wherein the set of blockchain nodes verifies the new forward block of data, and if the new forward block of data is verified, then the set of blockchain nodes relay the new forward block of data to the distributed clients; and a VerifyBlock protocol, wherein the distributed clients verify authenticity of the new forward block of data using a new public key, and if the new forward block of data is determined to be authentic, then the distributed clients store at least one of the reverse blocks of data and the new forward block of data.

In another aspect, following the Initialize protocol, all generated data is erased.

In another aspect, the forward blockchain comprises blocks of data, where each block of data after a first block of data contains a hash digest of a previous block of data, and wherein the reverse blockchain comprises blocks of data, where each block of data before a last block of data contains a hash digest of a next block of data.

In another aspect, the set of MPC Servers reveals one or more private keys and the reverse blocks of data to the signing server.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
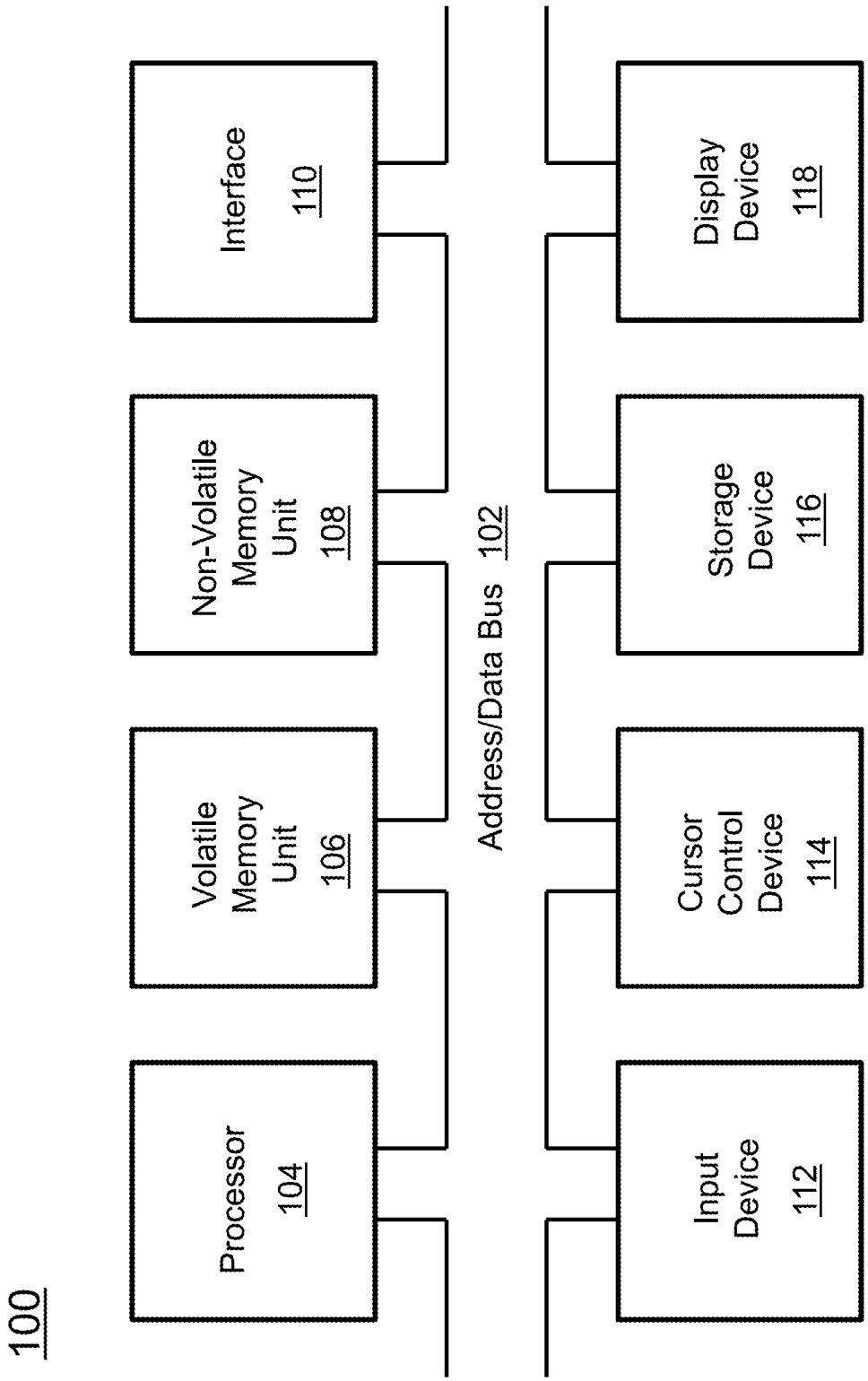
FIG. 1 is a block diagram depicting the components of a system for improving data authentication according to some embodiments of the present disclosure.

The present invention relates to a system for improving data authentication and, more particularly, to a system for improving data authentication using blockchain technology and multi-party computation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Guy Zyskind, Oz Nathan, and Alex Pentland. Enigma: Decentralized Computation Platform with Guaranteed Privacy. https://enigma.co/enigma_full.pdf. Retrieved Mar. 30, 2018.
2. Damgård I., Nielsen J. B. (2007) Scalable and Unconditionally Secure Multiparty Computation. In: Menezes A. (eds) Advances in Cryptology-CRYPTO 2007. CRYPTO 2007. Lecture Notes in Computer Science, vol 4622. Springer, Berlin, Heidelberg.
3. FIPS PUB 180-4, FEDERAL INFORMATION PROCESSING STANDARDS PUBLICATION, Secure Hash Standard (SHS).
4. Internet Engineering Task Force, PKCS #1: RSA Cryptography Specifications Version 2.2, Sections 7 and 8.

(2) Principal Aspects

Various embodiments of the invention include three "principal" aspects. The first is a system for improving data authentication. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
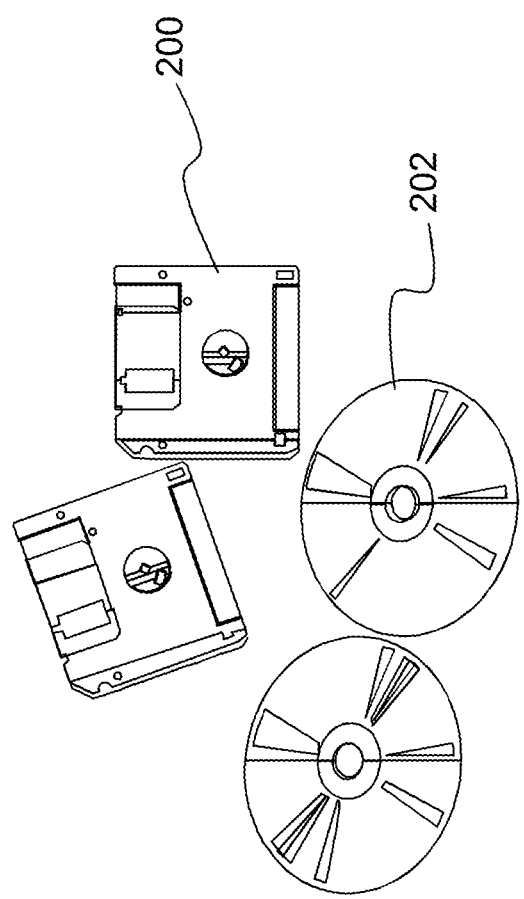
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a collection of protocols that ensure the authenticity of data sent from a collection of one or more servers to distributed clients (such as Internet of Things (IoT) devices). The invention described herein uses multi-party computation (MPC) protocols to ensure the secrecy of keys used to sign the distributed data, as well as blockchain technology to ensure the correctness and integrity of the received data. Specifically, a bidirectional blockchain is utilized in which the sequence of hashes that link blocks together run both forward and backward in time and, in doing so, make the communication process and associated system itself more secure, thereby making a marked technological improvement to authentication systems.

(3.1) Multiparty Computation (MPC)

A MPC protocol allows a group of servers to store data (known as a secret) in a distributed fashion and perform computations on the distributed data without revealing the secret to any individual server. Once the computation is complete, the servers can provide the output of the computation to one or more recipients.

During the execution of an MPC protocol, some of the servers may become corrupted. A server corruption is any change that may cause the server to reveal secret data or to behave in a manner not specified by the protocol description. A server corruption could mean: that that the server is infected with malware, which may allow an adversary to view all the server's data and cause the server to execute arbitrary code; that the server has lost or deleted data that it was supposed to keep; that the server has a hardware failure which causes unintended behavior; or that the server is experiencing network connectivity problems that prevent it from sending or receiving data properly.

MPC protocols are designed to be secure under the assumption that no more than a threshold number of servers are corrupted. The number of servers is denoted n and the corruption threshold is denoted t. This notation is common in MPC literature, and is used throughout this disclosure. For example, an MPC protocol may state that it is secure so long as less than one third of the servers are corrupted. In this case, the protocol requires that t<n/3, so that if, for instance, n=7, then the protocol would require that t is no more than 2, meaning that no more than 2 out of the 7 servers are corrupted. The specific values of n and t for the system according to embodiments of the present disclosure will depend on the MPC protocol being used.

In this disclosure, MPC subprotocols are used to construct the bidirectional blockchain protocol. Any MPC protocol from the literature will suffice (for instance Literature Reference No. 2), so long as it contains subprotocols as described below:

1. A secret sharing protocol, which allows a dealer to distribute shares of a secret among a group of servers, and possibly deliver auxiliary information to the servers as well. Whether or not auxiliary information is included will depend on which subprotocol from the literature is being used.
2. A secret reconstruction protocol, which allows the servers to use their shares and possibly auxiliary information to reveal a secret to a recipient.

(3.2) Blockchain

Figure 3:
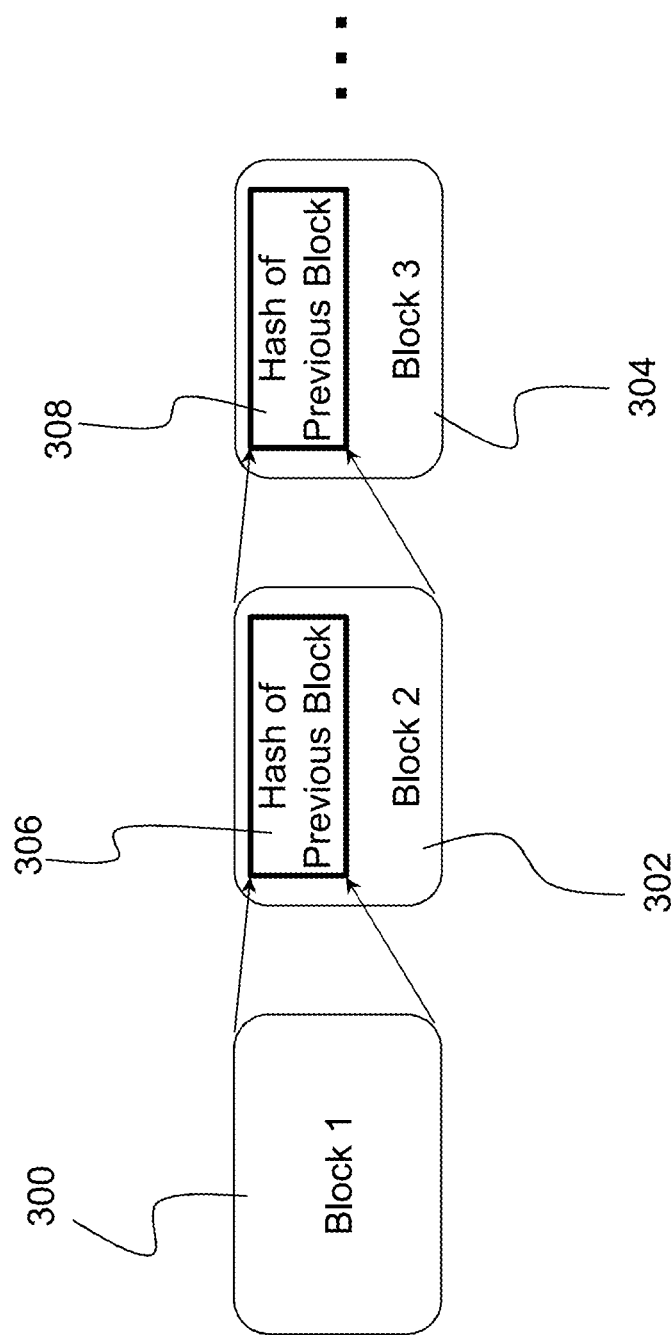
FIG. 3 is an illustration of a basic blockchain structure according to some embodiments of the present disclosure.

A blockchain is a collection of data that is segregated into a list of blocks. Each block is cryptographically linked to the previous block in such a way that one cannot edit a block without editing all subsequent blocks. This cryptographic linkage is normally achieved by including a hash digest of the previous block (or a hash digest of some portion of the previous block) in the subsequent block. A diagram of a basic blockchain structure is depicted in FIG. 3, showing a sequence of data blocks (Block 1 (element 300), Block 2 (element 302), and Block 3 (element 304)). As illustrated, Block 2 (element 302) includes a hash (element 306) of previous Block 1 (element 300), and Block 3 (element 304) includes a hash (element 308) of previous Block 2 (element 302).

A blockchain is stored by a group of blockchain nodes. The block generation protocol will vary depending on the blockchain protocol being used, but once a new block is generated, it is sent to one or more of the blockchain nodes. The recipients then confirm that the received block is valid, and if so, they distribute it to other blockchain nodes; invalid blocks are ignored. It may take some time for all blockchain nodes to receive the new block, but it is expected that eventually all blockchain nodes will agree on the contents of a given block in the chain. The method by which the blockchain nodes reach a consensus on the contents of a given block will vary depending on the blockchain protocol. For example, Bitcoin uses a proof of work based consensus, whereas Ripple uses a Byzantine fault tolerant consensus algorithm.

In most blockchain protocols, including the one described in this disclosure, the longest correctly-formed blockchain in existence is taken to be the correct one. It could be that there are two correctly-formed blockchains that are of the same length. When there are two correctly-formed blockchains in existence, each of which has maximal length, this event is referred to as a fork. A fork could occur if, for instance, a malicious adversary creates two distinct blockchains by adding two distinct blocks to the existing blockchain and then distributes the two blockchains to two distinct sets of entities. When an entity, such as a blockchain node, sees that a fork occurs (meaning that it receives two conflicting blockchain updates of maximal length), the entity cannot tell which is the correct one. How forks are resolved is dependent on the blockchain protocol.

(3.3) Bidirectional Blockchain

Figure 4:
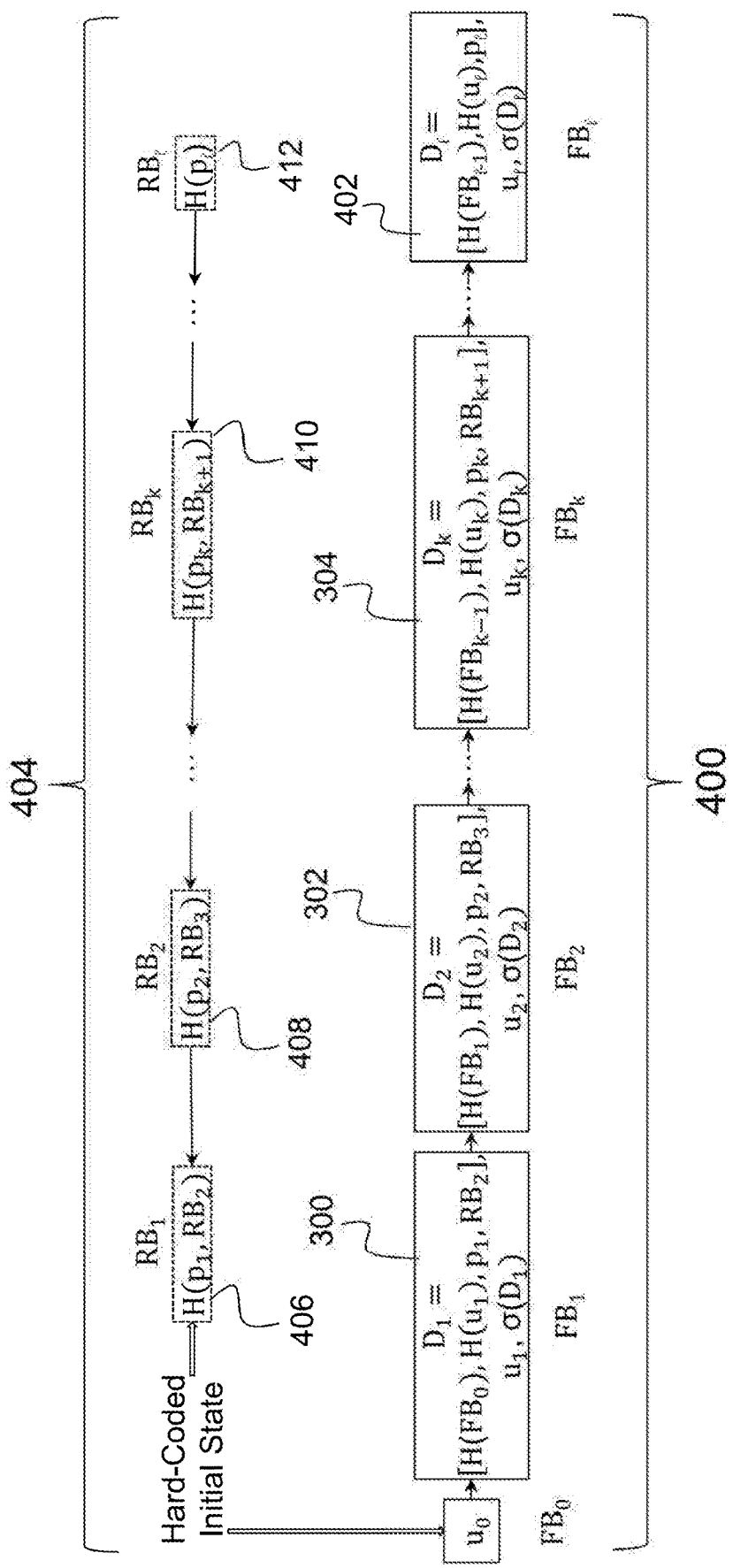
FIG. 4 is an illustration of a basic structure of a bidirectional blockchain according to some embodiments of the present disclosure.

The protocols described herein construct and utilize a bidirectional blockchain. As shown in FIG. 4, the bidirectional blockchain consists of two separate blockchains: a forward blockchain (element 400), in which each block (elements 302, 304, and 402) after the first (element 300) contains the hash digest of the previous block (as in a normal blockchain). The bidirectional blockchain further includes a reverse blockchain (element 404), in which each block (elements 406, 408, and 410) before the last (element 412) contains the hash digest of the next block. The two blockchains (elements 400 and 404) contain the same public keys (referred to as $p_k$ below), linking them together to form a bidirectional blockchain. In FIG. 4 and throughout this disclosure, $FB_k$ refers to the $k^{th}$ forward block and $RB_k$ refers to the $k^{th}$ reverse block.

The forward blockchains (element 400) store the actual data to be received/consumed by the clients. Since the longest blockchain in existence is taken to be the correct one, the forward blockchain (element 400) ensures that data recipients have correct, current data. The reverse blockchain (element 404) stores the public keys used by the clients to verify the authenticity of the data stored in the forward blockchain (element 400). This allows clients to know that a public key is valid (by ensuring that it is a part of the reverse blockchain (element 404)) without referring to a trusted third party. A non-limiting example of a system that can utilize the invention described herein includes a system of vehicles that are wirelessly connected to coordinate actions and share information. The wireless communication among connected vehicles is vulnerable to security threats, which can lead to vehicle safety hazards. Any warning messages being exchanged must be authenticated. In this example, the system described herein would allow a vehicle to know that a public key for accessing a message (or other data) is valid (by ensuring that it is a part of the reverse blockchain (element 404)) without referring to a trusted third party. Once authenticated, a file containing the message can be uploaded to the network, for example.

Furthermore, since the public keys are kept hidden until they are needed, this helps to secure against a scenario in which a vulnerability is found in the public key cryptography scheme that makes it faster for an adversary to compute a private key from a public key; since the window of time in which a public key is both valid and visible to nodes (such as blockchain nodes) is narrow, the time in which to compute the private key is also narrow. Thus, the combination of forward (element 400) and reverse blockchains (element 404) into a bidirectional blockchain provides an improvement over current technology. Specifically, the invention described herein provides a higher degree of security than could be achieved with a traditional blockchain or public key infrastructure (PKI) scheme, as in existing technologies.

(3.4) Entities Involved in the Protocol

Figure 5:
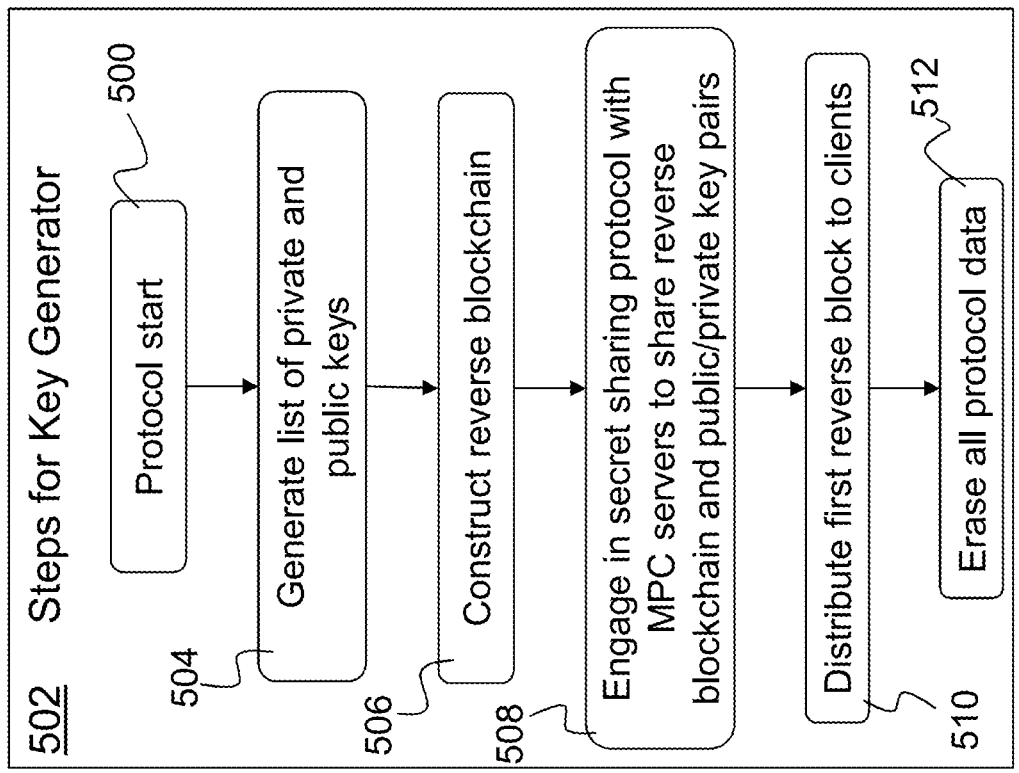
FIG. 5 is an illustration of a flow diagram of an Initialize protocol for data authentication according to some embodiments of the present disclosure.
Figure 6:
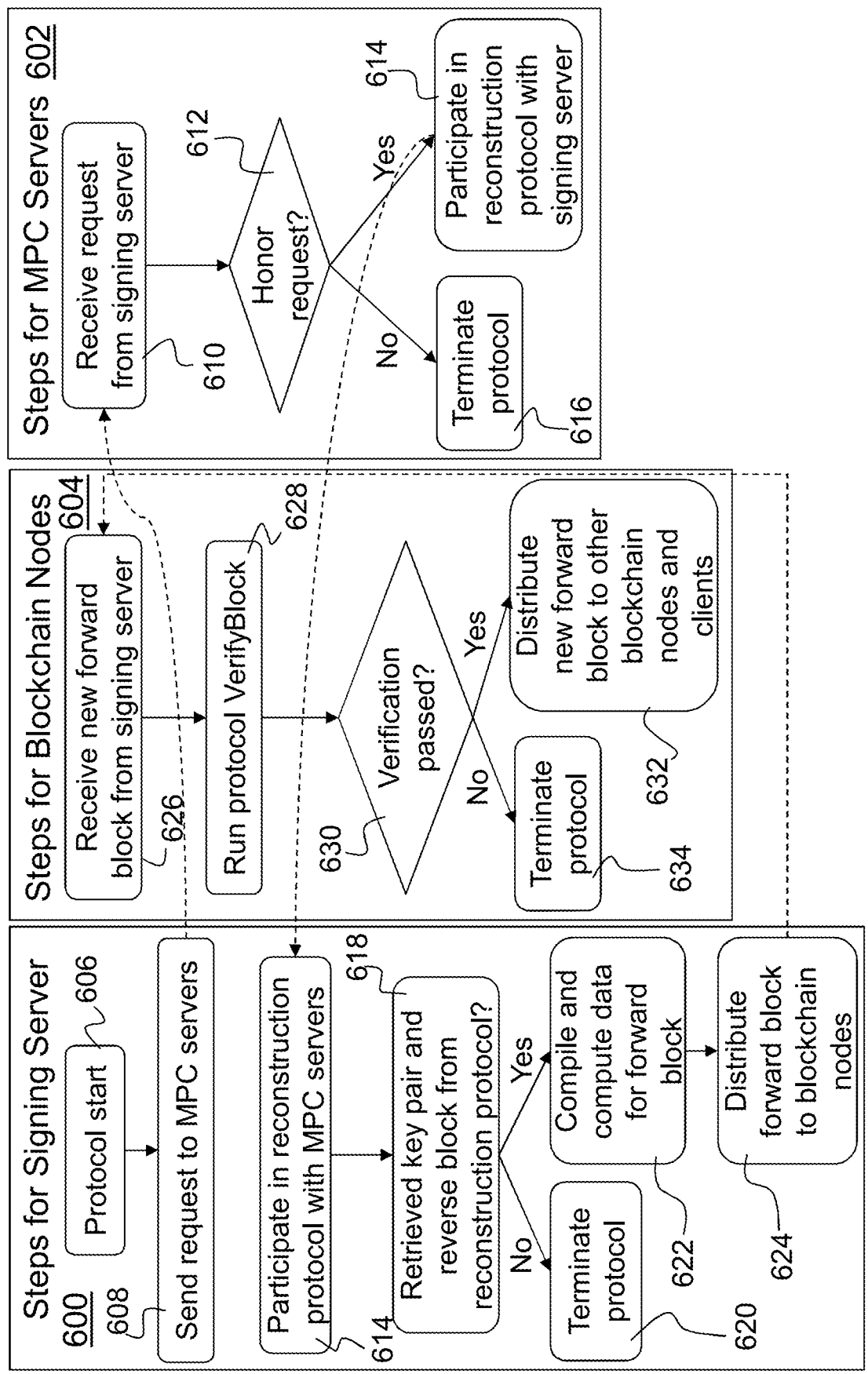
FIG. 6 is an illustration of a flow diagram of a Generate-Block protocol for data authentication according to some embodiments of the present disclosure.

The protocol according to embodiments of the present disclosure involves five distinct groups of entities, which are illustrated in FIGS. 5 and 6. Upon start of the protocol (element 500), the key generator (element 502), which is a computer or server, generates the private/public key pairs (element 504) and the reverse blockchain (element 506). The key generator (element 502) then engages in a secret sharing protocol with MPC servers to share reverse blockchain and private/public key pairs (element 508) and distributes the first reverse block to clients (element 510).

MPC Servers store the secret keys and reverse blocks. MPC servers reveal secret keys and reverse blocks to a signing server when appropriate. Signing servers are responsible for creating new blocks and distributing them to blockchain nodes. Blockchain nodes store the reverse and forward blockchain in full and provide the newly generated blocks to clients as they are received. Clients are the final consumers of the data contained in the bidirectional blockchain. The clients could be any type of distributed device. For example, the clients may be cell phones, vehicles, or aircraft that receive software updates from the blockchain nodes. When either a client or blockchain node notices that there is a fork, they report this fact to the fork server. Any entity (e.g., client or blockchain node) that notices a fork sends the fork server the two conflicting blockchains, and the fork server may then contact the MPC servers and a signing server so that a new block can be issued to resolve the fork by invoking the protocol GenerateBlock. Since the newly generated block will create a blockchain that is longer than either of the current blockchains, this will resolve the fork.

Note that the protocols described herein are agnostic as to which real-world entities and organizations control the protocol entities. For instance, if the data being supplied to clients are software updates from a manufacturer, then the manufacturer could control the key generator, MPC servers, signing servers, blockchain nodes, and fork servers, leaving only the clients under the control of the customer. Alternatively, the manufacturer could control the key generator and fork server, outsource the role of MPC servers and blockchain nodes to a distributed computing provider, and outsource the role of signing servers to a third-party software provider.

(3.5) Cryptographic Preliminaries

The protocol according to embodiments of the present disclosure assumes the existence of a one-way, collision-resistant hash function H (such as SHA-256 (see Literature Reference No. 3)). The protocol also assumes the existence of public key encryption protocols for key generation, signing, and verifying signatures (Such as RSA (see Literature Reference No. 4)). For a secret key $s_k$, the signature on data D using $s_k$ is denoted by $\sigma_k(D)$, which can be verified with public key $p_k$.

The key generator (element 502) must have a means of securely erasing all protocol data (element 512 in FIG. 5) to prevent the data from being stolen by an adversary at some point in the future. To implement this, it is assumed that the key generator (element 502) is able to quarantine a certain section of memory and store the keys and all temporary memory used to generate the keys in this section of memory. At the end of the Initialize protocol (described below), the signing server can then wipe this entire section of memory. This allows for efficient and secure data erasure.

(3.6) Protocol Use

An outline of how the protocols are used is as follows. The key generator (element 502) and MPC servers (element 602 of FIG. 6) participate in the Initialize protocol to generate the stored secret keys and reverse blocks. Each time a signing server (element 600) wants to sign a new piece of data (such as a software update), the signing server (element 600), the MPC servers (element 602), and blockchain nodes (element 604) participate in the GenerateBlock protocol, shown in FIG. 6. Each time a blockchain node (element 604) or client receives a new block (element 626), it invokes the VerifyBlock protocol (element 628) to ensure that it is authentic. Flow diagrams for these protocols are shown in FIGS. 5, 6, 7A, and 7B, which illustrate the Initialize protocol, the GenerateBlock protocol, and the VerifyBlock protocol, respectively.

As a non-limiting example, consider the case in which the data provided are software updates and the clients are cell phones. In this scenario, the MPC servers and key generator are owned by the cell phone company, the signing servers are owned by some third party software provider, and the blockchain nodes and fork server are operated by a cloud computing service. Before the initial software state is provided to the cell phones, the key generator (element 502) and MPC protocols participate in the Initialize protocol and then distribute the initial software state and reverse block to the cell phones. When a software update is needed, one of the signing servers that has the update participates in the protocol GenerateBlock with the MPC servers to generate a new forward block that contains the software update, thereby distributing it to the blockchain nodes and cell phones. The blockchain nodes and cell phones invoke the protocol VerifyBlock on the received data to confirm its authenticity. If any of the blockchain nodes or cell phones detects a fork, this is reported to the fork server, who can then resolve it.

(3.7) Protocol Specification

The details of the protocols unique to the invention described herein are given in this section. The protocols assume that the clients begin with some initial piece of data, $u_0$ (which could be an initial software state) as part of the hard-coded state of that device. This data $u_0$ is defined to be the initial forward block, $FB_0$. In addition, the protocols assume that the key generator (element 502) has some means of distributing the first reverse block $RB_1$ to the distributed devices so that it becomes a part of their hard-coded state.

(3.7.1) Initialize

As depicted in FIG. 5, the key generator (element 502) and MPC servers take as input a length l, which is the number of reverse blocks they wish to generate.

1. The key generator (element 502) generates a reverse blockchain as follows.

1.1. Generate a list of l secret/public key pairs (element 504)
   $\{(s_1, p_1), (s_2, p_2), \ldots, (s_l, p_l)\}$.

1.2. Compute a reverse blockchain (element 506) $\{RB_k\}_{k=1,\ldots,l}$ by setting $RB_l = H(p_l)$ and setting $RB_k = H(p_k, RB_{k+1})$ for $k = l-1, \ldots, 1$.

2. The key generator (element 502) engages in a secret sharing protocol (element 508) to distribute shares of each $p_k$, $s_k$, and $RB_k$ to the MPC servers for $k = 1, \ldots, l$.

3. The key generator (element 502) distributes $RB_1$ to the clients (element 510), which will be a part of their hard-coded initial state.

4. The key generator (element 502) erases all of its data generated during the course of the protocol (element 512).

(3.7.2) GenerateBlock

As depicted in FIG. 6, at the start of the protocol (element 606), the signing server (element 600) takes as input some piece of data u that it intends to distribute as a part of the next block.

1. A signing server sends a request for a secret key to the MPC servers (element 608).

2. The MPC servers receive the request (element 610) and individually determine if the request from the signing server is to be honored (element 612). (The details of how this determination takes place will depend on the type of data being signed, but this could be performed, for instance, by having the MPC servers check credentials provided by the signing server to ensure that it can be trusted to signing data.)

3. Any MPC server that determines that the request is to be honored participates in a secret reconstruction protocol with the signing server (element 614) to reconstruct $p_w$, $s_w$, and $RB_{w+1}$ to the signing server, where w is the smallest index such that the MPC servers have not revealed $s_w$ to any entity. (However, if w=1, then $RB_{w+1}$ is not reconstructed.) If any MPC server determines that the request should not be honored, the protocol terminates (element 616).

4. If the reconstruction procedure succeeds, the signing server defines $u_w$=u and computes $D_w$=(H($FB_{w-1}$),H($u_w$),$p_w$,$RB_{w+1}$) (unless w=1, in which case $D_w$=(H($FB_{w-1}$),H($u_w$),$p_w$) and $\sigma_w(D_w)$. The signing server determines if the key pair and reverse block are retrieved from the reconstruction protocol (element 618). If not, the protocol terminates (element 620). If the key pair and reverse block are retrieved, then the signing server compiles and computes for a forward block (element 622).

5. The signing server defines $FB_w$=($u_w$, $D_w$, $\sigma_w(D_w)$) and distributes $FB_w$ to the blockchain nodes (element 624).

6. The blockchain nodes (element 604) receive the new forward block from the signing server (element 626) and the new block is checked using the VerifyBlock protocol (element 628), and if the verification passes (element 630), they relay the new block to other blockchain nodes and clients to update the network (element 632). If the verification does not pass, the protocol terminates (element 634).

(3.7.3) VerifyBlock

Figure 7A:
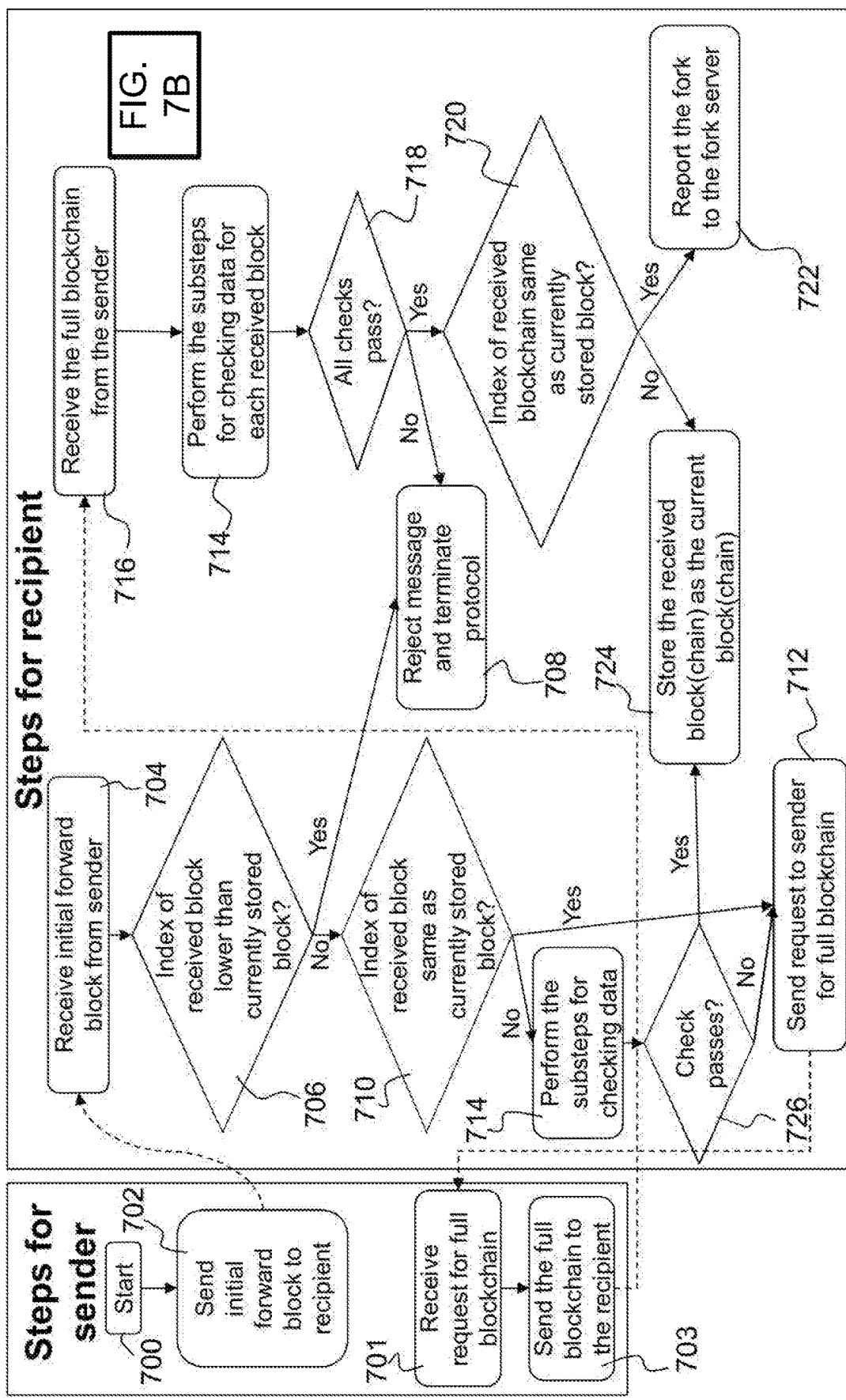
FIG. 7A is an illustration of a flow diagram of a first portion of a VerifyBlock protocol for data authentication according to some embodiments of the present disclosure.
Figure 7B:
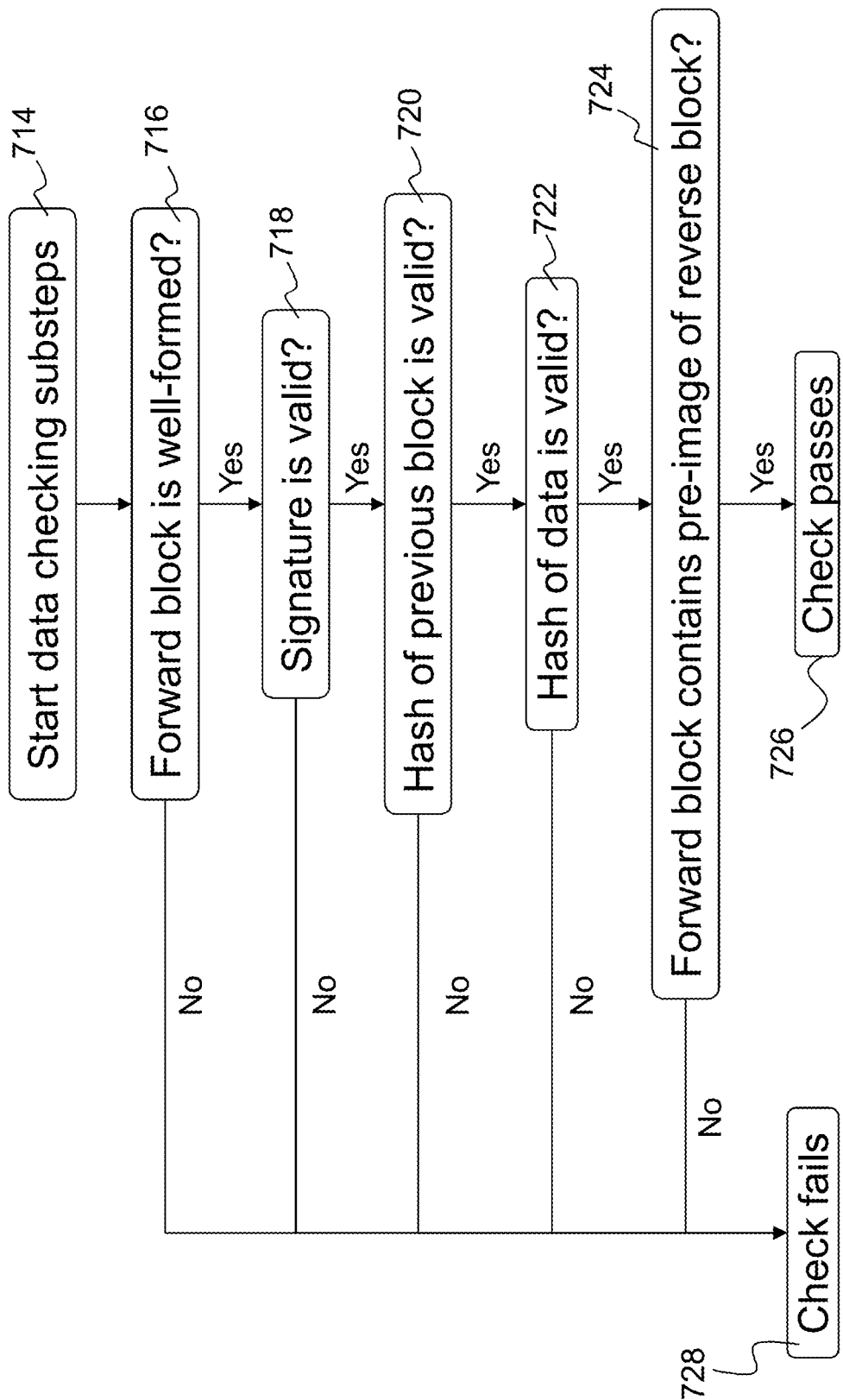
FIG. 7B is an illustration of a flow diagram of a second portion of VerifyBlock protocol for data authentication according to some embodiments of the present disclosure.

As depicted in FIG. 7A, at the start (element 700), an entity (hereafter, the "sender") sends an initial forward block to a recipient (e.g., blockchain node or client) (element 702). Upon receiving a new forward block $FB_w$ from the sender (element 704), the recipient performs the following steps of the VerifyBlock protocol (element 628) to verify the authenticity of the received data.

1. If the received forward block has a lower index than the currently stored forward block (element 706), then reject the message and terminate the protocol (element 708).

2. The recipient determines whether the index of the received block is the same as the currently stored block (element 710). If the received forward block has the same index as the currently stored forward block (i.e., the two forward blockchains are of the same length) but is not identical to the currently stored forward block, then go to step 5 to send a request to the sender for the full blockchain (element 712), which is received by the sender (element 701).

3. If the received forward block has an index that is greater than that of the currently stored forward block, then the recipient performs the substeps for checking data (element 714) and checks the following:
   a. The forward block is well-formed according to the specification given in protocols GenerateBlock and Initialize, respectively (element 716).
   b. $\sigma_w(D_w)$ is a valid signature on $D_w$ given the public key $p_w$ in $D_w$ (element 718).
   c. The first element H($FB_{w-1}$) in $D_w$ is a valid hash of the current forward block stored by the device (element 720).
   d. The second element H($u_w$) in $D_w$ is a valid hash of $u_w$ (element 722).
   e. Let $RB_c$ denote the latest reverse block stored by the recipient. If w≠1, then the recipient verifies that the last two elements ($p_w$,$RB_{w+1}$) in $D_w$ satisfy $RB_c$=H($p_w$,$RB_{w+1}$). If w=1, then the recipient verifies that the last element $p_w$ in $D_w$ satisfies $RB_c$=H($p_w$) (element 724). When a hash function is computed, the input is called the pre-image, and the output is called the hash or hash digest. More specifically, if H(A)=B, then A is the pre-image of the hash digest B.

4. If all of the above checks pass (element 726), then the recipient moves to Step 9. Otherwise, the check fails (element 728), and the recipient moves to Step 5.

5. The recipient sends a request to the sender that provided $FB_w$ for all forward and reverse blocks in the blockchain from ($FB_1$,$RB_2$) up to ($FB_w$, $RB_{w+1}$) (element 712).

6. Once received (element 716) from the sender that sends the full blockchain to the recipient (element 703), the recipient performs the checks in Step 3 for each pair of forward and reverse blocks received from the sender (element 714).

7. If all of the checks in Step 6 succeed (i.e., all checks pass (element 718), then go to Step 8. Otherwise, the recipient terminates the protocol and rejects all of the data received from the sender (element 708).

8. The recipient determines if the received forward block has the same index as the currently stored forward block (element 720). If yes, then send both the newly received blockchain and the stored forward block (or entire blockchain, if it is stored) to the fork server and terminate the protocol (element 722). Otherwise, go to Step 9.

9. The recipient stores the forward and reverse blocks ($FB_w$,$RB_{w+1}$) received from the sender as its current forward and reverse blocks (element 724). If the recipient is a blockchain node, it keeps all the blocks received during the protocol execution. If the recipient is a client, it deletes all forward and reverse blocks except for ($FB_w$,$RB_{w+1}$) and the hard-coded pair ($FR_0$,$RB_1$).

In the system according to embodiments of the present disclosure, a new public/private key pair is used each time a new piece of software is signed, and the use of the new key causes the previous key to expire. Thus, the window of time in which a key is valid, and, hence, the window of time in which an adversary must compromise a key in order to falsify data, is small. This is achieved by storing data in a forward blockchain and storing the public keys used for verifying the data in a reverse blockchain. These two blockchains together comprise a bidirectional blockchain. By updating the current state of the reverse blockchain, a data recipient can verify the authenticity of keys without contacting a trusted third party, and each time such an update occurs, the previous key expires. The Enigma project (see Literature Reference No. 1) combines blockchain technology with multiparty computation. However, the combination is being used for providing publicly auditable MPC.

The invention described herein can be used by a vehicle manufacturer to insure the integrity of software updates delivered to vehicles or aircraft. The MPC protocols ensure that the secret keys used to sign the software updates are secure against an adversary that attempts to steal them. The blockchain technology allows the vehicles or aircraft to verify that the software is legitimate without communicating with a central, trusted server.

Finally, while this invention has been described in terms of several embodiments, one of ordinary skill in the art will readily recognize that the invention may have other applications in other environments. It should be noted that many embodiments and implementations are possible. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for verifying authenticity of data sent to distributed clients, the system comprising:
one or more processors and a non-transitory computer-readable medium having executable instructions encoded thereon such that when executed, the one or more processors perform an operation of:
ensuring authenticity of a set of distributed data sent from one or more servers to the distributed clients, where in ensuring authenticity of the set of distributed data, the one or more processors perform operations of:
initializing a plurality of multiparty (MPC) protocols to ensure secrecy of keys used to sign a new data element; and
utilizing blockchain technology to ensure correctness and integrity of the new data element, wherein a bidirectional blockchain, comprising a forward blockchain and a separate reverse blockchain, is used such that the forward blockchain stores the new data element to be received by the distributed clients, and the reverse blockchain stores a public key used by the distributed clients to verify authenticity of the new data element stored in the forward blockchain,
wherein signing of the new data element with the public key causes a previous public key to expire.

2. The system as set forth in claim 1, wherein the plurality of MPC protocols comprises:
an Initialize protocol, wherein a list of public-private key pairs is generated, the reverse blockchain, comprising reverse blocks of data, is constructed, and the list of public-private key pairs, comprising public keys and private keys, and the reverse blocks of data are stored in a distributed manner among a set of MPC servers;
a GenerateBlock protocol that allows a signing server to generate a new forward block of data and distribute the new forward block of data to a set of blockchain nodes, wherein the set of blockchain nodes verifies the new forward block of data, and when the new forward block of data is verified, then the set of blockchain nodes relay the new forward block of data to the distributed clients; and
a VerifyBlock protocol, wherein the distributed clients verify authenticity of the new forward block of data using a new public key, and when the new forward block of data is determined to be authentic, then the distributed clients store at least one of the reverse blocks of data and the new forward block of data.

3. The system as set forth in claim 2, wherein following the Initialize protocol, all generated data is erased.

4. The system as set forth in claim 1, wherein the forward blockchain comprises blocks of data, where each block of data after a first block of data contains a hash digest of a previous block of data, and wherein the reverse blockchain comprises blocks of data, where each block of data before a last block of data contains a hash digest of a next block of data.

5. The system as set forth in claim 2, wherein the set of MPC Servers reveals one or more private keys and the reverse blocks of data to the signing server.

6. A computer implemented method for verifying authenticity of data sent to distributed clients, the method comprising an act of:
causing one or more processors to execute instructions encoded on a non-transitory computer-readable medium, such that upon execution, the one or more processors perform operations of:
ensuring authenticity of a set of distributed data sent from one or more servers to the distributed clients, where in ensuring authenticity of the set of distributed data, the one or more processors perform operations of:
initializing a plurality of multiparty (MPC) protocols to ensure secrecy of keys used to sign a new data element; and
utilizing blockchain technology to ensure correctness and integrity of the new data element, wherein a bidirectional blockchain, comprising a forward blockchain and a separate reverse blockchain, is used such that the forward blockchain stores the new data element to be received by the distributed clients, and the reverse blockchain stores a public key used by the distributed clients to verify authenticity of the new data element stored in the forward blockchain,
wherein signing of the new data element with the public key causes a previous public key to expire.

7. The method as set forth in claim 6, wherein the plurality of MPC protocols comprises:
an Initialize protocol, wherein a list of public-private key pairs is generated, the reverse blockchain, comprising reverse blocks of data, is constructed, and the list of public-private key pairs, comprising public keys and private keys, and the reverse blocks of data are stored in a distributed manner among a set of MPC servers;
a GenerateBlock protocol that allows a signing server to generate a new forward block of data and distribute the new forward block of data to a set of blockchain nodes, wherein the set of blockchain nodes verifies the new forward block of data, and when the new forward block of data is verified, then the set of blockchain nodes relay the new forward block of data to the distributed clients; and
a VerifyBlock protocol, wherein the distributed clients verify authenticity of the new forward block of data using a new public key, and when the new forward block of data is determined to be authentic, then the distributed clients store at least one of the reverse blocks of data and the new forward block of data.

8. The method as set forth in claim 7, wherein following the Initialize protocol, all generated data is erased.

9. The method as set forth in claim 6, wherein the forward blockchain comprises blocks of data, where each block of data after a first block of data contains a hash digest of a previous block of data, and wherein the reverse blockchain comprises blocks of data, where each block of data before a last block of data contains a hash digest of a next block of data.

10. The method as set forth in claim 7, wherein the set of MPC Servers reveals one or more private keys and the reverse blocks of data to the signing server.

11. A computer program product for verifying authenticity of data sent to distributed clients, the computer program product comprising:

computer-readable instructions stored on a non-transitory computer-readable medium that are executable by a computer having one or more processors for causing the processor to perform operations of:

ensuring authenticity of a set of distributed data sent from one or more servers to the distributed clients, where in ensuring authenticity of the set of distributed data, the one or more processors perform operations of:

initializing a plurality of multiparty (MPC) protocols to ensure secrecy of keys used to sign a new data element; and utilizing blockchain technology to ensure correctness and integrity of the new data element, wherein a bidirectional blockchain, comprising a forward blockchain and a separate reverse blockchain, is used such that the forward blockchain stores the new data element to be received by the distributed clients, and the reverse blockchain stores a public key used by the distributed clients to verify authenticity of the new data element stored in the forward blockchain, wherein signing of the new data element with the public key causes a previous public key to expire.

12. The computer program product as set forth in claim 11, wherein the plurality of MPC protocols comprises:

an Initialize protocol, wherein a list of public-private key pairs is generated, the reverse blockchain, comprising reverse blocks of data, is constructed, and the list of public-private key pairs, comprising public keys and private keys, and the reverse blocks of data are stored in a distributed manner among a set of MPC servers;

a GenerateBlock protocol that allows a signing server to generate a new forward block of data and distribute the new forward block of data to a set of blockchain nodes, wherein the set of blockchain nodes verifies the new forward block of data, and when the new forward block of data is verified, then the set of blockchain nodes relay the new forward block of data to the distributed clients; and a VerifyBlock protocol, wherein the distributed clients verify authenticity of the new forward block of data using a new public key, and when the new forward block of data is determined to be authentic, then the distributed clients store at least one of the reverse blocks of data and the new forward block of data.

13. The computer program product as set forth in claim 12, wherein following the Initialize protocol, all generated data is erased.

14. The computer program product as set forth in claim 11, wherein the forward blockchain comprises blocks of data, where each block of data after a first block of data contains a hash digest of a previous block of data, and wherein the reverse blockchain comprises blocks of data, where each block of data before a last block of data contains a hash digest of a next block of data.

15. The computer program product as set forth in claim 12, wherein the set of MPC Servers reveals one or more private keys and the reverse blocks of data to the signing server.

* * * * *